W. J. THOMPSON.
PLATE HOLDER FOR CAMERAS.
APPLICATION FILED DEC. 21, 1912.
1,079,810.
Patented Nov. 25, 1913.
3 SHEETS—SHEET 1.
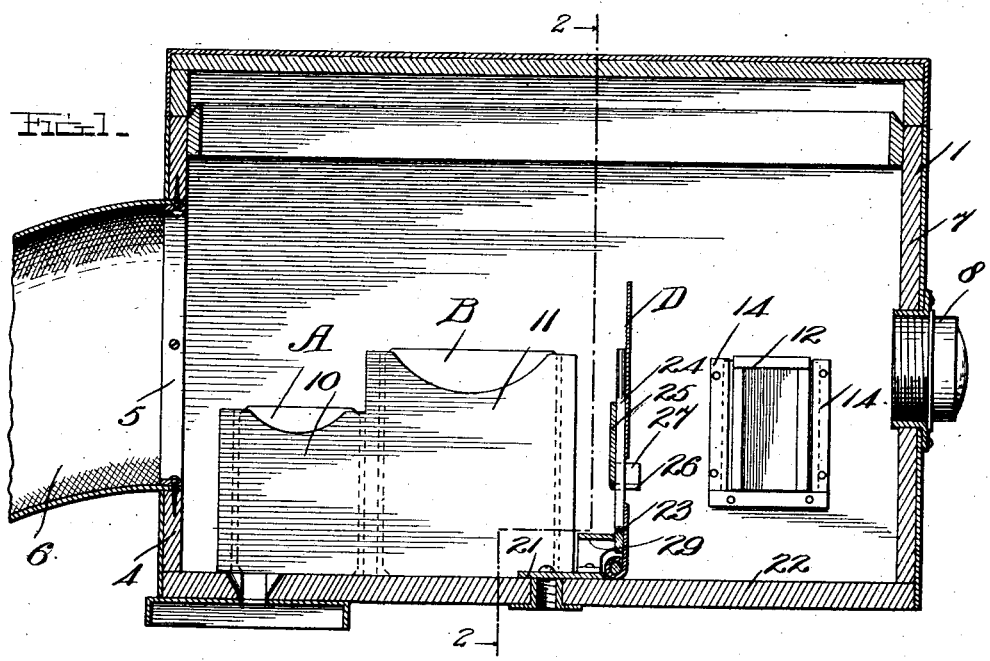
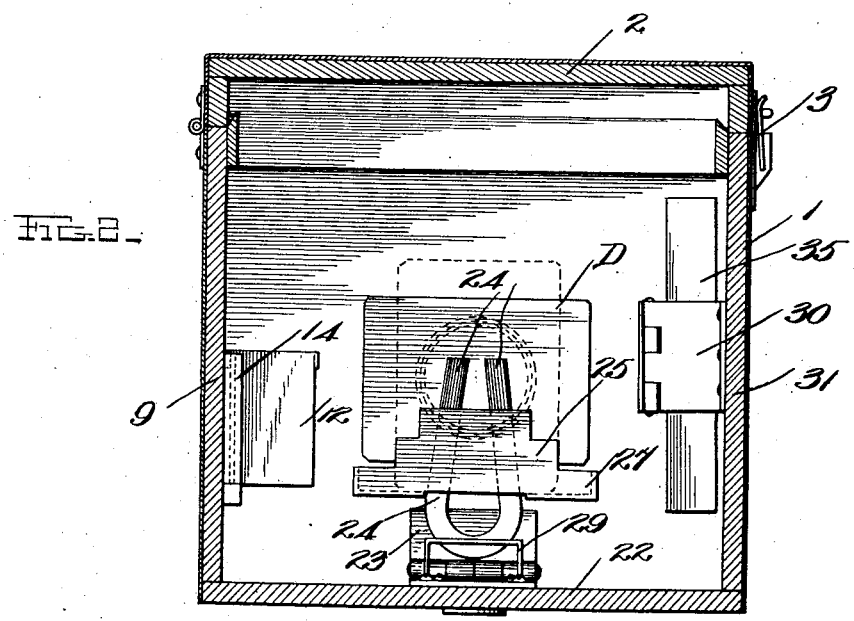
WITNESSES:
INVENTOR
William J. Thompson,
BY
Wilkinson, Witherspoon & Mackin
ATTORNEY

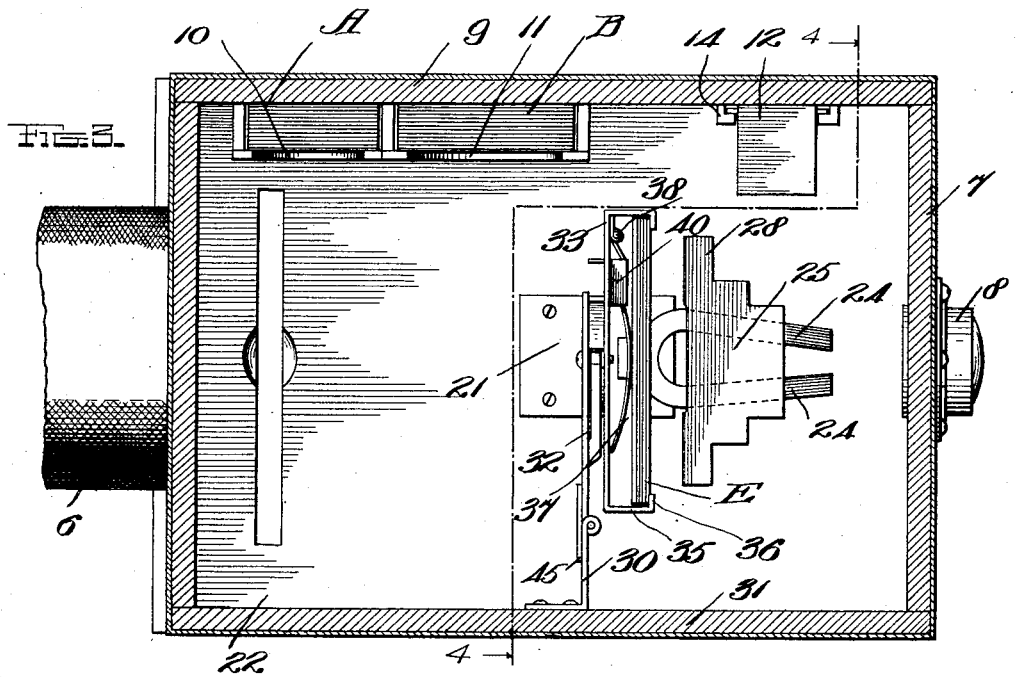

W. J. THOMPSON.
PLATE HOLDER FOR CAMERAS.
APPLICATION FILED DEC. 21, 1912.
1,079,810.  Patented Nov. 25, 1913.
3 SHEETS—SHEET 3.
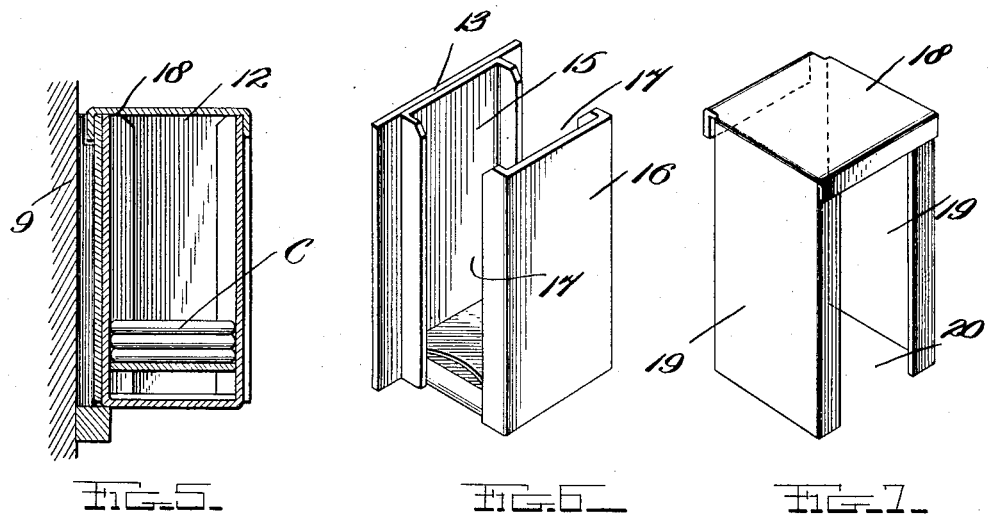
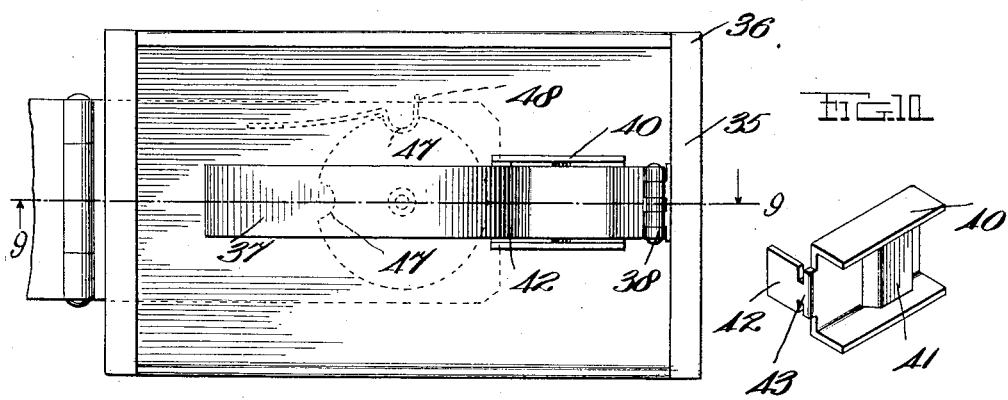
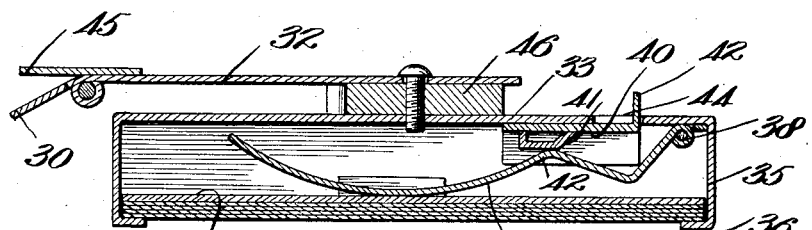
WITNESSES:  INVENTOR
            William J. Thompson
         BY
            Wilkinson, Whittorafton & Mackay
                                ATTORNEY

UNITED STATES PATENT OFFICE.

WILLIAM J. THOMPSON, OF NEW YORK, N. Y.

PLATE-HOLDER FOR CAMERAS.

1,079,810.  Specification of Letters Patent.  Patented Nov. 25, 1913.

Application filed December 21, 1912. Serial No. 738,038.

*To all whom it may concern:*

Be it known that I, WILLIAM J. THOMPSON, a citizen of the United States, residing at New York, in the county of New York and State of New York, have invented certain new and useful Improvements in Plate-Holders for Cameras; and I do hereby declare the following to be a full, clear, and exact description of the invention, such as will enable others skilled in the art to which it appertains to make and use the same.

The present invention relates to plate holders for cameras of that type wherein the camera is equipped with means for holding sets of plates of different sizes, any plate of which may be conveniently presented before the lens for exposure.

The invention as disclosed herein is a modification of that construction shown in my U. S. patent application bearing Serial No. 698,535, dated July 25, 1912; and has for its purpose to provide separate means for holding plates of different kinds in front of the lens; and wherein each of said means is adapted to be moved into operative position when the other of said means has been moved out of position.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a longitudinal sectional view of a camera equipped with the present invention; Fig. 2 is a transverse sectional view thereof taken on the line 2—2 of Fig. 1 and looking in the direction of the arrows; Fig. 3 is a top plan view of the camera with the cover removed; Fig. 4 is a transverse sectional view of Fig. 3 taken on the line 4—4 thereof; Fig. 5 is a vertical sectional view of the device for holding buttons; Fig. 6 is a detail perspective view of one part of the button holding device; Fig. 7 is a similar view of another part of said button holding device; Fig. 8 is a front elevational view of the post card holding device; Fig. 9 is a longitudinal sectional view thereof taken on the line 9—9 of Fig. 8; and Fig. 10 is a detail perspective view of the locking slide of the post card holding device.

Referring to the construction in detail, 1 indicates the camera body, or casing, having a hinged cover 2 that is adapted to be secured in closed position by suitable clips 3. The rear wall 4 is cut away, as at 5, to provide an opening for the arm of the photographer; and a sleeve 6 is provided for said arm opening, as in the usual manner. The front wall 7 of the casing is fitted with a lens 8. The side wall 9 of the casing is provided with a pair of compartments, or pockets, 10 and 11 of relatively different sizes, and adapted for holding sensitized plates A and relatively larger sensitized plates B. A metallic casing 12 is also mounted on the side wall 9 of the camera, and is adapted for holding in stack form a plurality of buttons C, likewise having sensitized surfaces. Said button holding casing 12 comprises a metallic member 13 removably fitting within holding members 14, and having fixed thereon a button receiver 15, having a closed front 16 and side openings 17. A cover overlies the button receiver and consists of a top plate 18, and side plates 19 which close the side openings 17. Said sides 19 provide an opening 20, which is closed by the front plate 16 of the button receiver when the cover is in applied position.

A hinge 21 is secured, in any suitable manner, to the bottom 22 of the casing, and the hinge member 23 has fixed thereon, in any suitable manner, a magnet 24; a magnet of the horse-shoe type being shown. A plate 25 is secured to the magnet, and has its lower edge formed with a pair of flanges 26 providing supports; and its side edges formed with flanges 27 providing retaining devices for the sensitized plate, or card, D which is held by the magnet in position for exposure. Said plate 25 is also formed with irregular, or stepped, side edges 28 which are for the purpose of enabling the positioning of the plates by the fingers of the hand, as clearly stated in my co-pending application for patent, above referred to.

The plate holding device above described is adapted to be moved out of position by being swung downwardly against the bottom 22 of the casing, as in that manner shown in Figs. 3 and 4. The upright position of said device is determined by a stop 29 which is secured to the hinged part 21 in any suitable manner.

The plate holding device is adapted for supporting the plates A and B, or the buttons C, and a means is also provided for holding post cards E when the photograph is to be taken is to be of that type. To this end a bracket 30 is secured to the side wall 31 of the casing, and has hingedly mounted thereon an arm, or plate, 32 in such manner that said arm may be swung into or out of position within the focus of the lens, as shown in Figs. 2, 3 and 4.

A clip comprising a holder 33 is swivelly mounted on the arm 32 through the medium of a pin 34, and said holder is provided with side members 35 and retaining flanges 36 adapted for holding a pack of post cards E having sensitized surfaces. The pack of cards is held within the clip through the medium of a plate 37 hinged at 38 to the holder 33; and said plate 37 is moved into position to engage with a follower 39 by a slide 40, that carries a cam 41, which cam engages with a shoulder 42 on the plate 37. The cam slide is mounted to be moved on the clip through the medium of a finger piece 42 formed integrally therewith, and which is provided with a reduced portion 43 that fits and slides within a slot 44, as shown in Figs. 9 and 10. With this construction, it will be readily seen that the cards of the pack may be secured by moving the slide in one direction, and released for the removal of a card by moving the slide in the opposite direction.

The clip for holding the pack of post cards to be exposed holds the individual cards with an absolutely smooth surface for exposure, and thus enables the photograph to be accurately taken. When post cards, or similar sheets, have their surfaces sensitized, said sheets as a result would necessarily curl, and it is to avoid this difficulty that the clip in the present instance is provided with the follower 39, which is adapted to be kept in contact with the pack of sheets through the medium of the pivoted plate 37 and the cam slide 40. During the period of exposure, said plate 37 is held in contact with the follower to keep the outermost card D in proper position in front of the lens, and after the photograph has been taken, said plate 37 is released to permit of the withdrawal or removal of the exposed card to be developed. The next card of the pack in succession is then in position for photographing, as will be understood.

The clip holding arm 32 is provided with a plate 45 which engages with the bracket 30 and serves as a stop for determining the proper position for holding the post cards for exposure. The holder 33 is also adapted to be moved into an upright or horizontal position for accordingly presenting the post cards for taking pictures thereon either in the lengthwise or cross-wise direction. To this end a detent is provided and comprises an annular member, or block, 46 formed with notches 47 which are engaged by a spring member 48, as in that manner shown in Fig. 8.

From the foregoing, it will be seen that a camera is provided for taking pictures on a variety of plates of different types and sizes, any one of which is at all times within convenient reach of the hand of the photographer; and that when the plate holding device is moved out of position, the card holding device may be moved into position, and vice versa; thus simplifying greatly the inner mechanism of the camera and enabling of all of the parts thereof being readily manipulated.

It is obvious that those skilled in the art may vary the details of construction and arrangement of parts without departing from the spirit of my invention, and therefore I do not wish to be limited to such features except as may be required by the claims.

What I claim is:—

1. A camera comprising a casing; a device hingedly mounted therein adapted for holding a sensitized plate in position for exposure; and means associated with said device for presenting said plate in relatively different angular positions for exposure, substantially as described.

2. A camera comprising a casing; devices hingedly mounted therein adapted for holding sensitized plates in position for exposure, and movable vice versa into and out of exposure position; and means associated with one of said devices for presenting the plates to be exposed in relatively different angular positions, substantially as described.

3. A camera comprising a casing; a device hingedly mounted on the bottom wall thereof and adapted for holding a sensitized plate in position for exposure; a device hingedly mounted on the side wall of the casing and adapted for holding a pack of sensitized plates in position for successive exposures; and means associated with said pack holding device for presenting the plates in relatively different angular positions for exposure, substantially as described.

4. A camera comprising a casing; a magnet hingedly mounted on a wall thereof for holding a sensitized plate to be exposed; a plate having an irregular edge secured to the magnet for facilitating the positioning of plates of different sizes on the magnet; a device hingedly mounted on another wall of the casing for holding a pack of sensitized plates to be successively exposed, said devices movable vice versa into and out of position for exposure; and means associated with the pack holding device for presenting the plates in different angular positions for exposure, substantially as described.

5. A camera comprising a casing; a bracket hinged to the bottom wall of the casing; a device secured to said bracket and adapted for holding sensitized plates to be exposed; a bracket hinged to a side wall of the casing; and a plate holding clip swiveled on said bracket and adapted for presenting the plate in different angular positions for exposure, substantially as described.

6. A camera comprising a casing; a bracket hinged to swing vertically from the bottom wall of the casing; a stop for limiting the upward movement of the bracket; a device secured to said bracket adapted for holding sensitized plates of different sizes to be exposed; a bracket hinged to swing laterally from a side wall of the casing; a stop for limiting the lateral movement of the said bracket; a clip swiveled on said lateral swinging bracket and adapted to hold sensitized plates to be exposed, said clip adapted to present the plates in different angular positions for exposure; and a detent for holding the clip in different positions, substantially as described.

7. A clip for holding a pack of sensitized flexible sheets in a camera comprising a support; a casing mounted on the support and having an open front; a follower adapted to contact with and hold the pack of sheets against the open front of the casing and keep the sheet smooth for exposure; a spring for resiliently holding said follower against the pack while photographing, and a slide having a cam coöperable with the spring to hold the follower in position, and permitting the release of the follower to remove the exposed sheets, substantially as described.

In testimony whereof, I affix my signature, in presence of two witnesses.

WILLIAM J. THOMPSON.

Witnesses:
WILLIAM DRYPOLCHER,
J. R. THUMAN.

Copies of this patent may be obtained for five cents each, by addressing the " Commissioner of Patents, Washington, D. C."